United States Patent Office 3,414,129
Patented Dec. 3, 1968

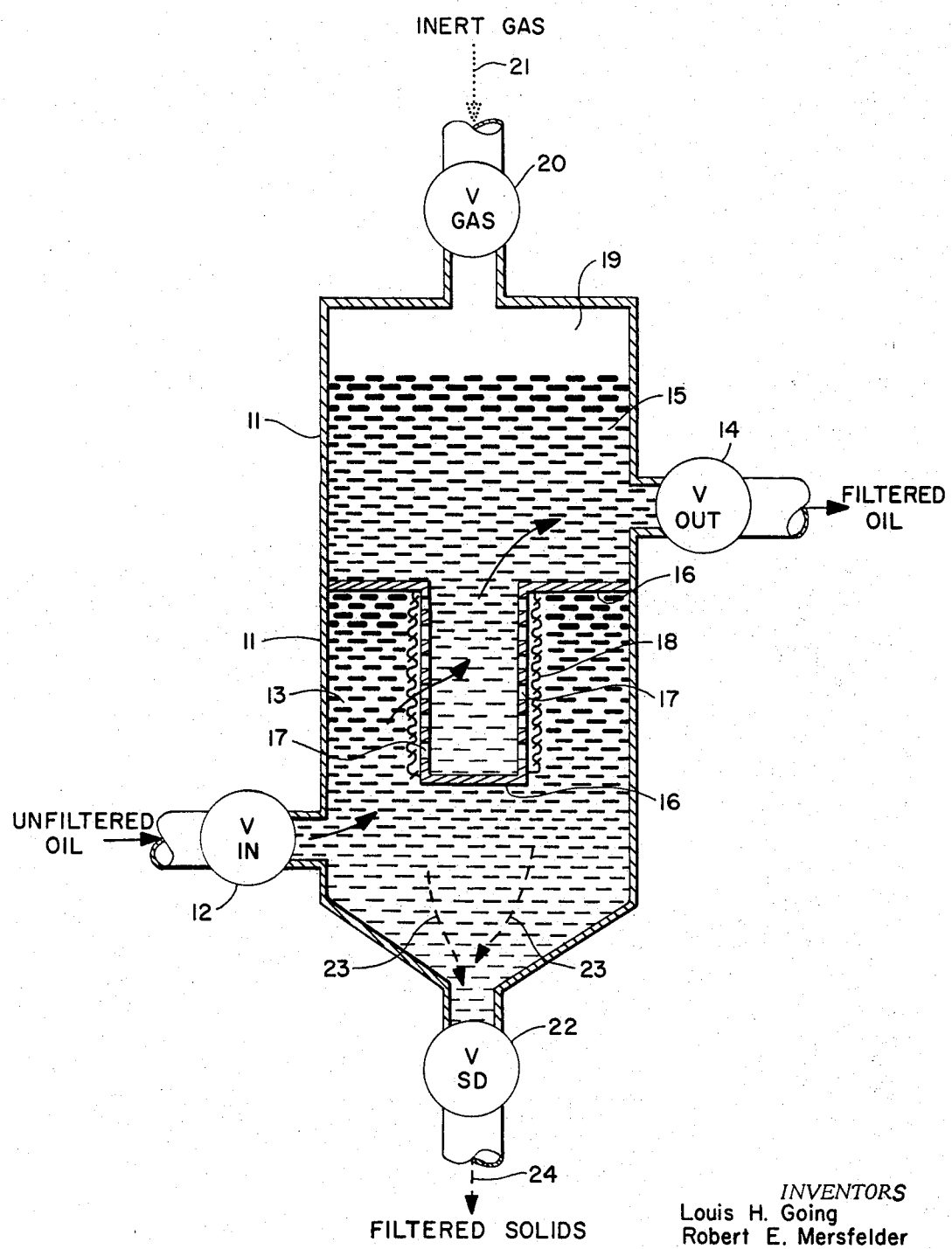

3,414,129
HIGH TEMPERATURE, OXYGEN-FREE EDIBLE OIL FILTRATION
Louis H. Going, Deerfield Township, Warren County, Robert E. Mersfelder, Springfield Township, Hamilton County, and Robert O. Schmitt, Wyoming, Ohio, assignors to The Procter & Gamble Company, Cincinnati, Ohio, a corporation of Ohio
Filed Dec. 27, 1967, Ser. No. 693,865
8 Claims. (Cl. 210—82)

ABSTRACT OF THE DISCLOSURE

A process for high temperature (150–500° F.) edible oil filtration, which permits high speed filtration in the absence of oxygen and convenient removal of filtered solids from the filter apparatus, without exposure of the oil or filtered solids to air or water.

BACKGROUND OF THE INVENTION

This invention relates to an improvement in edible oil filtration. More specifically, it relates to the filtration of solids from hot edible oils in a manner which protects the hot oils and solids from the destructive influence of air.

The processing of edible oils requires the filtration of solids from the oils at various stages. For example, edible oils are usually bleached with bleaching earth to improve their color. This bleaching earth is removed from the oil by filtration. In the case of hydrogenated oils, the hydrogenation catalyst is removed by filtration. Impurities occurring in the crude oils or added during processing are also frequently removed by filtration.

Conventionally, these filtrations are performed at low temperatures in plate-and-frame filter presses which are open to the atmosphere. High temperature filtration is in general desirable, in order to lower the viscosity of the liquid being filtered and therefore to increase the rate of filtration and because the oil is often already at an elevated temperature due to previous processing steps. In order to prevent oxidation by the air, however, filtration of edible oils has previously usually been carried out at temperatures below about 150° F.

The past use of enclosed inert-gas-blanketed plate-and-frame filter presses or other enclosed filter mechanism has made possible filtration of oils at high temperature. These devices, however, are subject to various drawbacks. Because of the enclosed nature of the system, removal of filtered solids from the filter requires that additional filters be utilized in alternation or that filtration be stopped for substantial lengths of time while the filter system is (1) cooled sufficiently for handling; (2) opened for removal of the filtered solids; and (3) re-purged with inert gas after the solids have been removed and the filter system has been reassembled. Usually the residual oil associated with filtered solids is recovered, i.e., separated from the solids and used. Frequently, particularly in the case of hydrogenation catalyst, it is desired to recover the solids filtered from the oil as well. It is necessary that these solids and residual oil be recovered without injury to them, such as would occur if the solids were washed away with water or exposed to the air while hot, i.e., at temperatures greater than about 150° F. Automatic internal solids removal from a closed filter apparatus by washing with water, which can be used in other kinds of filtration, is not practical in the case of edible oil filtration because the water contaminates the filters, oil, and solids.

Hence, there is a real need in the edible oil filtration art for a process of filtering edible oils at high temperatures, without exposing these oils to the danger of oxidation by air; and also of removing filtered solids from the filter apparatus without exposure of the oil (whether unfiltered, filtered, or associated with the filtered solids), or of the filtered solids themselves, to air or water.

SUMMARY OF THE INVENTION

In view of the above-stated need, the present invention provides a process for filtering solids from an edible oil, which comprises:

(A) Introducing a flow of solids-containing oil at a temperature ranging from about 150° to about 500° F. into a gas-tight housing containing a flexible filter medium in the flow of oil and a cushion of inert gas downstream of the filter medium;

(B) Filtering the oil through the filter medium, thereby depositing the solids on the filter medium;

(C) Withdrawing filtered oil from the housing downstream of the filter medium;

(D) Periodically dislodging the deposited solids from the filter medium by (1) Stopping the withdrawal until the pressure in the cushion increases (preferably to at least 30 p.s.i.g., but not greater than 100 p.s.i.g.), then (2) Stopping the introduction, then (3) Abruptly opening the housing on the upstream side of the filter medium thereby causing the filter medium to flex and dislodge the deposited solids; and (E) Removing the dislodged solids from the housing; the entire process being performed in the absence of oxygen.

The advantages of the process outlined above are many. Edible oils can be filtered at high speed (because of the lower viscosity of these oils at the high temperatures of the process), but without risk of air oxidation which normally would occur at these temperatures.

The unfiltered oil, the filtered oil, and the residual oil associated with the filtered solids are all protected from oxidation. The residual oil associated with the filtered solids can be recovered from the filtered solids and used. This recovery can either be explicit (as for example when the bleaching earth is refiltered in a secondary filter) or implicit (as for example when hydrogenation catalyst and oil are mixed with additional unhydrogenated oil to reuse the catalyst).

Additional advantages are that oils which are processed (e.g., bleached or hydrogenated) at high temperatures need not be cooled to a temperature at which air oxidation will not occur before filtration, nor need they be reheated for the next step in processing. The process is easily subject to automation, since each starting or stopping of flow of oil, and the removal of filtered solids from the inlet chamber of the filter apparatus, can be accomplished by a switch which is activated by a pressure change or the passage of time.

Another advantage is that a relatively short period of time is required for cleaning, and filtration can be nearly continuous without the need for an alternate filter apparatus.

Yet another advantage occurs when the filtered solids are a bleaching earth which bleaches more effectively at higher temperatures. Since in this case the amount of bleaching which occurs while the oils are filtered increases when the oils are filtered hot, the amount of bleaching earth required to accomplish the same amount of bleaching is reduced.

Still another advantage occurs when hydrogenation catalyst is filtered. Since the entire process occurs in the absence of air, poisoning of the catalyst by high temperature contact with air is eliminated, and catalyst recycle life can be extended.

DESCRIPTION OF THE DRAWING

The drawing is a schematic representation of a filter apparatus which can be used in the process of this invention. Housing 11 is gas-tight, oxygen-free, and has an inlet valve 12 through which unfiltered oil enters an inlet chamber 13 of the filter apparatus, and an outlet valve 14 through which filtered oil leaves an outlet chamber 15 of the filter apparatus. A dividing and filtering member 16, 17, 18 is positioned within the housing 11 between the inlet chamber 13 and the outlet chamber 15. The dividing and filtering member comprises (a) a filter medium support member 16 having openings 17 (e.g., perforations, holes or the like) between the inlet chamber 13 and the outlet chamber 15, and (b) a flexible filter medium 18 upon which filtered solids (not shown) are deposited. The flexible filter medium 18 covers the openings 17 between the inlet chamber 13 and the outlet chamber 15. Although a filter medium support member 16 comprising a single tube and a single flexible filter medium 18 are shown in the drawing, a filter medium support member 16 comprising a plurality of tubes, and a plurality of flexible filter mediums 18 can be used within a single housing 11. The cushion of inert gas 19 is within the outlet chamber 15 and can be provided by a storage cylinder of inert gas (not shown) through a gas valve 20, as indicated by the dotted-line arrow 21.

The flow of oil through the filter apparatus is indicated on the drawing by solid-line arrows. In operation, unfiltered solids-containing oil enters the inlet chamber 13 of the filter apparatus through the inlet valve 12, passes through the flexible filter medium 18 and is thereby filtered. The filtered oil then passes through the openings 17 of the filter medium support member 16, into the outlet chamber 15, and leaves the filter apparatus through the outlet valve 14. Solids (not shown) are deposited on the surface of the inlet chamber side of the flexible filter medium 18 as the oil is filtered.

When it is desired to remove periodically the deposited filtered solids from the filter apparatus, for example when the pressure in the inlet chamber 13 indicates a buildup of filtered solids on the filter medium 18, the solids are dislodged as described below. Whenever the inlet valve 12 is open, the pressure in the inlet chamber 13 (i.e., the pressure upstream of the filter medium) equals the feed pressure forcing oil through the filter apparatus. As solids are deposited on the filter medium 18, an increasing amount of feed pressure is needed to maintain a constant flow rate, due to the increasing thickness of deposited solids on the filter medium 18. The maximum acceptable pressure in the inlet chamber 13 before solids are discharged varies with such factors as the detailed structure of the filter apparatus, the initial resistance of the filter medium 18, and particularly the nature of solids being filtered from the oil. The relevant limit is usually the volume of solids buildup which can be tolerated without interfering with a good separation of solids from the filter medium 18 when the solids are discharged, although other factors can be relevant, such as the maximum feed pressure obtainable in the system and the acceptable decrease in flow rate which can be tolerated when feed pressure can no longer be increased. For example, hydrogenation catalyst forms a relatively impermeable deposit of solids, and an increase of about 10 p.s.i. to about 15 p.s.i. in the feed pressure necessary to maintain constant flow (i.e., the pressure in the inlet chamber 13 when a substantial quantity of solids have been deposited on the filter medium 18, minus the pressure at the beginning of filtration, before any substantial quantity of solids have been deposited), frequently indicates that the solids should be dislodged. On the other hand, bleaching earth forms a much more permeable deposit, and feed pressure is limited to a lesser increase, depending on the permeability of the bleaching earth used. Other methods of determining when to dislodge solids are the passage of time, or the amount of bleaching earth or other solids known to have entered the filter apparatus, since the last dislodging of solids.

When it is determined (by whatever means) that it is desired to dislodge the solids which have built up on the filter medium 18, the outlet valve 14 is closed, but the flow of oil into the filter apparatus through the inlet valve 12 is continued. This causes a compression of, and increases the pressure in, the cushion of inert gas 19 within the outlet chamber 15. When sufficient compression has occurred so that an increased pressure is obtained in the cushion of inert gas 19, the inlet valve 12 is closed, which stops the flow of oil into the filter apparatus and maintains the increased pressure in the cushion of inert gas 19.

The pressure in the inlet chamber 13 is then abruptly allowed to drop, e.g., by opening a solids discharge valve 22, which causes the cushion of inert gas 19 to expand. This expansion reverses the normal flow of oil and forces oil from the outlet chamber 15 through the openings 17 in the filter medium support member 16 and through the flexible filter medium 18, and into the inlet chamber 13. The rapid pressure drop and reverse flow of oil flexes the flexible filter medium 18, which in turn dislodges the filtered solids, as indicated by the broken-line arrows 23. The dislodged filtered solids are removed from the inlet chamber 13 in the absence of oxygen, e.g., by ejection into a solids collection tank (not shown) from which has been removed any oxygen, for example by flushing with nitrogen.

After the solids have been discharged, the solids discharge valve 22 is closed. The inlet and outlet valves 12 and 14 are opened, and filtration is resumed. When the pressure in the inlet chamber 13 again indicates a buildup of solids on the filter medium 18, the solids are again dislodged and discharged. This sequence is repeated periodically.

Preferably, the pressure drop in the inlet chamber 13 and the removal of solids from the inlet chamber 13 are simultaneously accomplished by means of the solids discharge valve 22. By abruptly opening this valve, solids can be removed as they are dislodged as shown by the broken-line arrows 24. This procedure need not be followed, however, as the pressure drop can also be accomplished by removing the pressure from the inlet valve 12 and rapidly opening this valve. In this case, the dislodged filtered solids are subsequently removed from the inlet chamber 13.

DETAILED DESCRIPTION

The edible oils which can be filtered by the process of this invention include various substances of plant or animal origin which consist predominantly of glyceryl esters of fatty acids, e.g., triglycerides, including both those commonly called "oils" which are liquid at atmospheric pressure and room temperature, and those commonly called "fats" which are solid or semisolid under these conditions, but liquid at the temperature of filtration. Preferred oils are tallow, lard, and the common edible vegetable oils used for the production of salad oil and shortenings, e.g., cottonseed, safflower, palm, soybean, rapeseed, sunflower, corn, and coconut oils. The invention is particularly applicable to the filtration of soybean oil.

The solids which can be removed from edible oils by the process of this invention include impurities in the oils (e.g., meal, such as soybean or cottonseed meal; polymerized oil; soap; carbon; phospholipids; and phosphorous salts); bleaching earth; hydrogenation catalyst; and kieselguhr (diatomaceous earth). Typical concentrations of these solids range from about 0.003% to about 3% in the case of impurities in the oils; from about 0.01% to about 1% in the case of hydrogenation catalyst; and from about 0.1% to about 1.5% in the case of bleaching earth and kieselguhr. All percentages herein are by weight. The concentrations of solids which are removed from the oils therefore usually ranges from about 0.003% to about 3% by weight, but higher concentrations, e.g., up to about 10%, can be removed if the need arises.

Utilizing the apparatus described in the drawing, filtration can be accomplished by:

(A) Passing a flow of solids-containing oil at a temperature of about 150° F. to about 500° F. through a filter apparatus; said filter apparatus comprising:

(1) A gas-tight, oxygen-free housing having an inlet valve through which unfilterd oil enters an inlet chamber of the filter apparatus and an outlet valve through which filtered oil leaves an outlet chamber of the filter apparatus;

(2) A dividing and filtering member positioned within the housing between the inlet chamber and the outlet chamber, said dividing and filtering member comprising (a) a filter medium support member having openings between the inlet and outlet chambers and (b) a flexible filter medium upon which filtered solids are deposited, said flexible filter medium covering the openings between the inlet and outlet chambers; and (3) A cushion of inert gas within the outlet chamber;

(B) continuing the flow of oil into the filter apparatus through the inlet valve while stopping the flow of oil out of the filter apparatus whereby the cushion of inert gas within the outlet chamber becomes compressed, until an increased pressure, preferably of at least about 50 pounds per square inch gauge (p.s.i.g.), is obtained in the cushion of inert gas;

(C) Stopping the flow of oil into the filter apparatus while maintaining the increased pressure;

(D) Abruptly allowing the pressure in the inlet chamber to drop, preferably to atmospheric pressure, which causes the compressed cushion of inert gas to expand and force oil from the outlet chamber through the filter medium support member and the flexible filter medium into the inlet chamber, whereby the flexible filter medium flexes and the filtered solids are dislodged therefrom; and (E) Removing the dislodged filtered solids from the inlet chamber of the filter apparatus, the entire process being performed in the absence of oxygen.

Filtration is preferably accomplished with a tubular filter in which the filter medium support member comprises an individual tube or several tubes which are covered with flexible filter medium comprising fabric. The basic structure of such a filter is shown by J. C. Smith et al. at page 19-70 of R. H. Perry et al., eds., Chemical Engineer's Handbook (McGraw-Hill, 4th ed., 1963). When using a filter such as this, however, the outlet valve in the upper chamber should be positioned such that filtered oils can be removed without the escape of gas from the inert gas cushion in the upper chamber.

The filter need not be tubular, however, as a sieve and diaphragm can be used. If tubular filters are used, the filter medium support members can comprise porous or perforated cylinders, wire helixes, wire mesh frames, or other material. The flexible filter medium can be, for example, fabric or screen. Geometric configuration is relatively unimportant, and can be varied to suit individual needs. Those skilled in the filtration art will be able to construct a variety of filters which can be used in the process of this invention. Preferably, the walls of the housing should be sufficiently physically separated from the filter medium support member and the flexible filter medium that neither does the housing interfere with the dislodging of solids from the flexible filter medium, nor do the solids stick to the sides of the housing when rapidly dislodged.

By "flexible filter medium" is meant any flexible material through which an edible oil can pass, but which removes solids from the oil which passes through it. Thus, a flexible filter medium can be constructed from filter paper, natural membrane, or fabric or other woven material such as metal screen.

Preferably, the flexible filter medium is constructed from synthetic fabric, e.g., Dacron, Teflon, or nylon. Dacron is highly preferred. The size and closeness of threads is preferably such as to give an air permeability, as measured by the Frazier method, of between about 19 and about 30 cubic feet of air per square foot of filter area per minute at 0.5 inch of water pressure differential.

Nitrogen is the preferred inert gas for the cushion of inert gas, but other inert gases such as helium, neon, and argon can also be used.

An elevated pressure of at least about 30 p.s.i.g. in the inert gas cushion is required in most cases to obtain a good separation of dislodged solids from the flexible filter medium, and better separation is usually obtained at about 50 p.s.i.g. Higher pressures can be used, at least up to about 100 p.s.i.g.; but these pressures are usually not necessary and can place undue stress on the system, particularly the flexible filter medium. The preferred pressure range for compression of the inert gas cushion before dislodging the filtered solids is therefore from about 50 to about 100 p.s.i.g. In dislodging the filtered solids from the flexible filter medium, it is desirable to abruptly open the inlet chamber and thus allow the pressure therein to drop, e.g., to atmospheric pressure, in order to obtain a good separation of dislodged solids from the flexible medium.

The temperature of filtration can range from room temperature to about 500° F., but the chief benefits are obtained only above about 150° F., at which temperature the lowered viscosity of the oil makes possible appreciably increased filtration rates. This advantage becomes highly pronounced at about 250° F. The upper temperature limit is usually set by the melting or decomposition temperature of the flexible filter medium. For example, a Dacron [poly(ethylene terephthalate)] fabric flexible filter medium should not be used at a temperature over about 270° F.; a Teflon (perfluoropolyethylene) fabric flexible filter medium can be used up to about 400° F. Woven metal has a much higher limit, and does not restrict the filtration temperature. In such cases the upper temperature limit of filtration is set by the temperature at which the oils begin to decompose even without oxygen present, i.e., about 500° F. The desired filtration temperature is therefore from about 150° F. to about 500° F.; but within this range, from about 250° F. to about 400° F. is preferred, because substantial increase in flow rate can be obtained without damage to fabric flexible filter media.

The flow rate of oil through the filter apparatus can vary from about 10 pounds of oil per square foot of filter area per hour to about 300 pounds per square foot per hour. The higher flow rates are obtained at the higher temperatures, and at a temperature of 250° F., a flow rate of about 50 to about 150 pounds per square foot per hour can easily be attained with the preferred Dacron filter having an air permeability between about 19 and about 30 cubic feet of air per square foot of filter area per minute at 0.5 inch of water pressure differential.

EXAMPLE I

The process of this invention was utilized to remove nickel hydrogenation catalyst from hydrogenated soybean oil. The filter apparatus used comprised a pressure-tight, oxygen-free housing 11 of approximately cylindrical shape, horizontally divided into an inlet chamber 13 and an outlet chamber 15. The two chambers had inlet valve 12 and outlet valve 14, respectively, for the oil to enter and leave the filter apparatus. Between the inlet and outlet chambers, there was within the housing 11 a dividing and filtering member 16, 17, and 18 which comprised, as part of the filter medium support member 16, a single perforated cylinder 2½ inches in outside diameter and 35 inches in effective length. The upper open end of the cylinder was attached to a non-perforated plate which in turn was attached to the inner walls of the housing 11, thereby dividing the housing 11 into the inlet and outlet chambers 13 and 15 of the filter apparatus. The lower end of the cylinder was closed, so that the only openings between the inlet and outlet chambers in the dividing and filtering member 16, 17 and 18 were the perforations 17 in the sides of the cylinder. The flexible filter medium 18 was Dacron, having an air permeability between 19 and 30 cubic feet of air per square foot of filter area per minute at 0.5 inch of water pressure differential. It was cylindrical in form, about 2¾ inches in diameter. This medium size allowed an average clearance of about ⅛ inch relative to the 2½ inch cylindrical filter medium support member 16, when the flexible filter medium 18 was fully expanded. The flexible filter medium 18 was firmly clamped at the top and bottom to the top and bottom of the perforated cylinder, thereby covering all openings (perforations 17) between the inlet and outlet chambers; it had an effective filter area of about 275 square inches.

In addition to the inlet and outlet valves 12 and 14 described above, each chamber was fitted with another valve. The inlet chamber had a solids discharge valve 22 at the base of the filter apparatus through which filtered solids were discharged into a solids collection tank. The outlet chamber had a gas valve 20 at the top of the filter apparatus through which nitrogen gas from a gas storage tank was introduced into the filter apparatus, removing oxygen and providing gas for a cushion of inert gas 19 within the outlet chamber.

Soybean oil which had been refined and bleached was hydrogenated to an iodine value of about 107 with nickel catalyst. After hydrogenation, the oil had a concentration of about 0.04% nickel, 0.107% diatomaceous earth, and 0.18% total solids.

In the filtration cycle of this example, about 235 pounds of this oil were filtered in the filter described above. The temperature of the oil entering the filter in this cycle varied from 250° F. to 280° F.; leaving the filter, it varied from 239° F. to 251° F. The oil was at all times protected from atmospheric oxygen, and filtered oil of acceptable quality (i.e., unoxidized) was recovered from outlet valve 14. The rate of flow varied from about 102 to 105 pounds per hour, or from about 53.5 to about 54.5 pounds per square foot of filter area per hour. Filtration continued for 135 minutes, during which the pressure in the inlet chamber 13 of the filter apparatus (i.e., the feed pressure necessary to maintain the approximately constant flow rate) increased from an initial 7 p.s.i.g. to 18 p.s.i.g., indicating a substantial deposit of filtered catalyst on the flexible filter medium. The pressure in the cushion of inert gas 19 in the outlet chamber 15 was not measured at this time, but was at all times during filtration relatively low (below about 10 p.s.i.g.), as there was little resistance to prevent the filtered oil from leaving the outlet chamber 15 through outlet valve 14.

When the pressure in the inlet chamber 13 had risen to 18 p.s.i.g., the outlet valve 14 was closed, and flow was continued into the filter, compressing the inert gas cushion 19, until an increased pressure of 50 p.s.i.g. was reached in the cushion of inert gas 19 in the outlet chamber 15. The inlet valve 12 was then closed, and the solids discharge valve 22 was abruptly opened, allowing the pressure in the inlet chamber to drop to 0 p.s.i.g. This abrupt drop in pressure in the inlet chamber 13 caused the compressed cushion of inert gas 19 in outlet chamber 15 to expand and force filtered oil in a reversed direction, i.e., from the outlet chamber 15, through openings 17 in the filter medium support member 16 and the flexible filter medium 18, and into the inlet chamber 13. The abruptly reversed oil flow caused the flexible filter medium to flex, and dislodged the filtered catalyst and other solids from the flexible filter medium. The dislodged solids left the inlet chamber 13 through the solids discharge valve 22, and were thence removed from the housing by transfer to the solids collection tank, which had been purged of oxygen with nitrogen. The filtered catalyst was recovered in the form of a concentrated slurry in oil, reusable in that form. After the filter discharge was fully accomplished, the solids discharge valve was closed. The filtration process was resumed until the solids again needed to be discharged from the filter medium, at which time the sequence was repeated.

The entire process was performed in the absence of oxygen, by purging both the filter apparatus and the solids collection tank with nitrogen before used.

EXAMPLE II

Example I is repeated, except substituting refined and bleached soybean oil containing 0.5% bleaching earth for the hydrogenated oil containing catalyst, or substituting a Teflon filter medium for the Dacron filter medium. Substantially similar results are obtained, in that a filtration rate in excess of 50 pounds per square foot per hour is attained, and the bleaching earth is removed from the oil without exposure of the oil or filtered solids to air. When bleaching earth is filtered from the oil, the filtered bleaching earth and residual oil are cooled and the residual oil, undamaged by oxygen, is recovered. When other solids in concentrations of from about 0.003% to about 3%, such as kieselguhr or soybean or cottonseed meal are removed, and/or the filter medium is nylon, substantially similar results are also obtained.

What is claimed is:

1. A process for filtering solids from edible oil, which comprises:
   (A) introducing a flow of solids-containing oil at a temperature ranging from about 150° to about 500° F. into a gas-tight housing containing a flexible filter medium in the flow of oil and a cushion of inert gas downstream of the filter medium;
   (B) filtering the oil through the filter medium, thereby depositing the solids on the filter medium;
   (C) withdrawing filtered oil from the housing downstream of the filter medium;
   (D) periodically dislodging the deposited solids from the filtered medium by
      (1) stopping the withdrawal until the pressure in the cushion increases, then
      (2) stopping the introduction, then
      (3) abruptly opening the housing on the upstream side of the filter medium thereby causing the filter medium to flex and dislodge the deposited solids; and
   (E) removing the dislodged solids from the housing; the entire process being performed in the absence of oxygen.

2. The process of claim 1 in which the solids filtered are selected from the group consisting of impurities in the oils, bleaching earth, hydrogenation catalyst, and kieselguhr.

3. The process of claim 2 in which the solids filtered are present in the unfiltered oil in a concentration ranging from about 0.003% to about 3% by weight.

4. The process of claim 3 in which the temperatures of the flow of oil ranges from about 250° F. to about 400° F.

5. The process of claim 4 in which the step (D)(1) the pressure in the cushion increases to at least about 30 pounds per square inch gauge.

6. The process of claim 4 in which in step (D)(1) the pressure in the cushion increases to a pressure ranging from about 50 pounds per square inch gauge to about 100 pounds per square inch gauge.

7. The process of claim 6 in which the flow of oil is passed through the filter apparatus at a rate of from about 50 pounds per square foot of filter area per hour to about 150 pounds per square foot of filter area per hour.

8. The process of claim 7 in which the flexible filter medium is fabric of poly(ethylene terephthalate), perfluoropolyethylene, or nylon.

References Cited

UNITED STATES PATENTS

| 2,383,672 | 8/1945 | Neisingh | 210—410 |
| 2,720,314 | 10/1955 | Booth | 210—410 |
| 2,867,639 | 1/1959 | Watts | 260—428 |

SAMIH N. ZAHARNA, *Primary Examiner.*